United States Patent
Bucourt et al.

[11] 3,818,054
[45] June 18, 1974

[54] NOVEL 7α-METHYL-13β-ALKYL-18,19-DINOR-Δ⁴,⁹,¹¹ PREGNATRIENES

[75] Inventors: Robert Bucourt; André Pièrdet, both of Noisy-le-Sec, France

[73] Assignee: Roussel Uclaf, Paris, France

[22] Filed: Nov. 28, 1972

[21] Appl. No.: 310,169

[30] Foreign Application Priority Data
Dec. 8, 1971  France .............................. 71.44013

[52] U.S. Cl. ........... 260/397.3, 260/397.45, 424/242
[51] Int. Cl. ......................................... C07c 169/34
[58] Field of Search ...................................
/Machine Searched Steroids

[56]  References Cited
UNITED STATES PATENTS

| | | | |
|---|---|---|---|
| 3,313,703 | 4/1967 | Bucourt et al. | 167/74 |
| 3,346,454 | 10/1967 | Bucourt et al. | 167/74 |
| 3,424,745 | 1/1969 | Joly et al. | 260/239.5 |
| 3,453,267 | 7/1969 | Vignau et al. | 260/239.55 |

Primary Examiner—Henry A. French
Attorney, Agent, or Firm—Hammond & Littell

[57]  ABSTRACT

Novel 7α-methyl-13β-alkyl-18,19-dinor-Δ⁴,⁹,¹¹-pregnatrienes of the formula

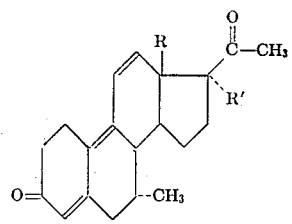

(I)

wherein R is alkyl of one to three carbon atoms and R' is selected from the group consisting of hydrogen, alkyl of one to three carbon atoms and OR'' wherein R'' is selected from the group consisting of hydrogen and acyl of an organic carboxylic acid of one to 18 carbon atoms having very intense antiandrogenic activity without manifesting antihypophysical properties with LH predominance to weak degree and to novel process and intermediates.

3 Claims, No Drawings

NOVEL 7α-METHYL-13β-ALKYL-18,19-DINOR-Δ⁴,⁹,¹¹-PREGNATRIENES

STATE OF THE ART

U.S. Pat. No. 3,346,454 describes 19-nor-Δ⁴,⁹,¹¹-pregnatrienes of the formula

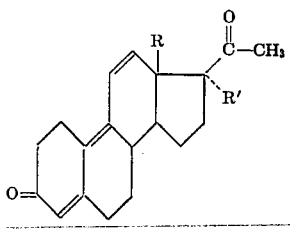

wherein R and R' are alkyl of one to four carbon atoms having progestative and progestomimetic activities.

OBJECTS OF THE INVENTION

It is an object of the invention to provide novel 7α-methyl-18,19-dinor-Δ⁴,⁹,¹¹-pregnatrienes of formula I.

It is a further object of the invention to provide a novel process for the preparation of compounds of formula I and novel intermediates produced therein.

It is another object of the invention to provide novel antiandrogenic compositions.

It is an additional object of the invention to provide a novel method of treating hyperandrogenia in warm-blooded animals.

These and other objects and advantages of the invention will become obvious from the following detailed description.

THE INVENTION

The 7α-methyl-13β-alkyl-18,19-dinor-Δ⁴,⁹,¹¹-pregnatriene-3,20-diones of the invention have the formula

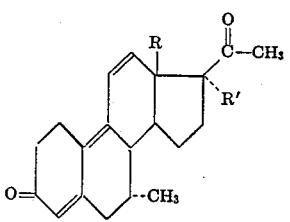

wherein R is alkyl of one to three carbon atoms and R' is selected from the group consisting of hydrogen, alkyl of one to three carbon atoms and OR" wherein R" is selected from the group consisting of hydrogen and acyl of an organic carboxylic acid of one to 18 carbon atoms. Preferably, R is methyl and R' is hydrogen and where R' is acyl, it is preferably derived from a hydrocarbon carboxylic acid.

Examples of suitable acids are alkanoic acids, such as formic acid, acetic acid, propionic acid, butyric acid, isobutyric acid, valeric acid, isovaleric acid trimethyl acetic acid, caproic acid, β-trimethylpropionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids such as acetylacetic acid, propionylacetic acid and butyrylacetic acid; amino acids such as diethylaminoacetic acid and aspartic acid.

The novel process of the invention for the preparation of the compounds of formula I comprises subjecting a ketal of the formula

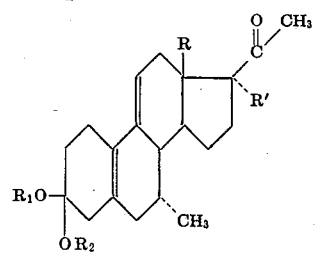

wherein R and R' have the above definition and R₁ and R₂ are alkyl of one to five carbon atoms or together form an alkylene of two to four carbon atoms to acid hydrolysis to form a compound of the formula

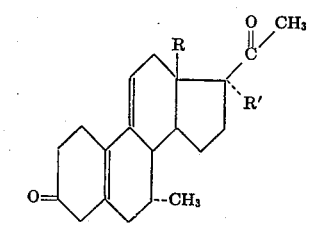

reacting the latter with a hydroperoxidation agent to form a compound of the formula

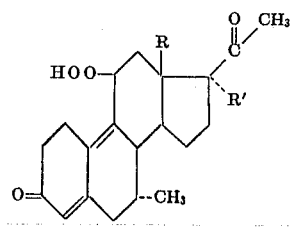

reducing the latter with a reducing agent to form a compound of the formula

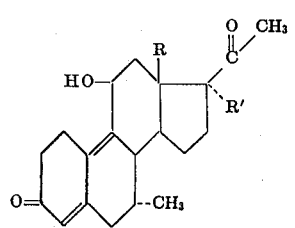

and dehydrating the latter with a mineral acid to form the corresponding compound of formula I.

The hydrolysis of the compound of formula II may be effected with an organic carboxylic acid such as formic acid, acetic acid, citric acid or tartaric acid in an aqueous media or in the presence of a polar solvent such as an alkanol like methanol or ethanol or in the presence of a nonpolar solvent such as chloroform, dioxane, tetrahydrofuran or benzene. Hydrolysis may also be effected by functional exchange with an α-aldehydic acid or α-ketonic acid such as glyoxalic acid, pyruvic acid or tartronic acid. Also usable is an aldehyde or ketone in the presence of a mineral or organic acid such as formol in the presence of hydrochloric acid.

The hydroperoxidation of the compound of formula III may be effected by bubbling oxygen or air therethrough in the presence of a tertiary amine such as triethylamine or pyridine. The reducing agent may be an alkyl phosphite, or alkyl sulfide or an alkali metal iodide such as potassium iodide in the presence of an alkanoic acid such as acetic acid. The dehydration of the compound of formula V is effected with a strong mineral acid such as perchloric acid or sulfuric acid in the presence of a polar solvent such as acetonitrile or trifluoroacetamide.

The starting compounds of formula II wherein R' is hydrogen and R, $R_1$ and $R_2$ have the above definitions may be prepared by reacting a compound of the formula

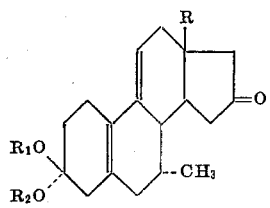

VI with a triarylethylphosphonium halide in a basic media to obtain a compound of the formula

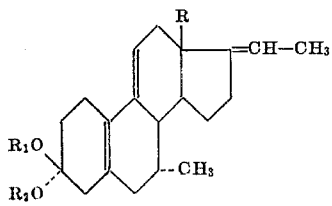

VII reacting the latter with borane and then hydrogen peroxide to obtain a compound of the formula

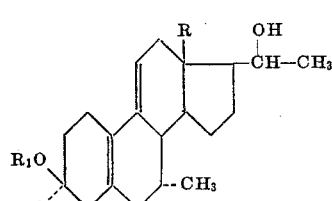

VIII which is then oxidized to the compound of formula II.

The starting compounds of formula II wherein R' is OH or OAcyl or alkyl of one to three carbon atoms may be prepared by reacting a compound of formula VII with a hydroxylating oxidation agent to form a compound of the formula

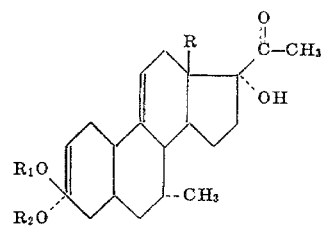

IX which may be esterified with an organic carboxylic acid or a functional derivative thereof or if desired may be reacted with a dehydrated agent to form a compound of the formula

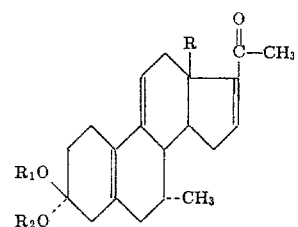

X reducing the latter with an alkali metal and reacting the resulting carbanion with an alkyl halide in the presence of an alkali metal to obtain the compound of formula II wherein R' is alkyl of one to three carbon atoms.

The compounds of formula III, IV and V are novel products.

The novel antiandrogenic compositions of the invention are comprised of an effective amount of a compound of formula I and a pharmaceutical carrier. The compositions may be in the form of injectable solutions or suspensions in ampoules or multiple dose flacons or in the form of tablets, coated tablets, emulsions, gelules, or suppositories prepared in the usual fashion.

The compositions possess very intense exogenic antiandrogenic activity so that they are useful in human theraphy against pathological manifestations of juvenile acne such as comedos, papulo-pustuls, tuberculopustuls or deep nodules, facial seborrhea and hairy skin and against adenoma of the prostate. The compounds of formula I are differentiated from known 19-nor-pregnatriene-3,20-diones by very sensibly diminished central properties as they do not manifest antihypophysial properties with LH predominance to a weak degree and equally manifests antiestrogenic activity even at elevated dosages.

The novel method of the invention for the treatment of hyperandrogenia comprises administering to warm-blooded animals an antiandrogenic amount of a compound of formula I. The compounds may be administered rectally, orally or parentally. The usual daily useful dose is 0.4 to 8 mg/kg depending upon the product and the method of administration.

In the following examples there are described several preferred embodiments to illustrate the invention. However, it should be understood that the invention is not intended to be limited to the specific embodiments.

EXAMPLE

Preparation of 7α-methyl-19-nor-$\Delta^{4,9,11}$-pregnatriene-3,20-dione

Step A: 3,3-dimethoxy-7α-methyl-19-nor-$\Delta^{5(10),9(11),17(20)}$-pregnatriene A solution of 2.04 g of potassium tert.-butylate and 6.75 g of triphenylethylphosphonium bromide in 30 ml of tetrahydrofuran was refluxed for 15 minutes and after cooling the solution to 20°C, 2 g of 3,3-dimethoxy-7α-methyl-$\Delta^{5(10),9(11)}$-estradiene-17-one (described in British Pat. No. 1,127,747) were added thereto. The mixture was stirred at room temperature for 15 hours and was then poured into a water-ice mixture. The tetrahydrofuran was distilled off at 40°C under reduced pressure and the aqueous phase was extracted with benzene. The benzene extracts were washed with water, dried over sodium sulfate and evaporated to dryness to obtain 7.4 g of a mixture of 3,3-dimethoxy-7α-methyl-19-nor-$\Delta^{5(10),9(11),17(20)}$-pregnatriene and 3-methoxy-7α-methyl-19-nor-$\Delta^{3,5(10),9(11),17(20)}$-pregnatetraene which was used as is for the next step.

To obtain the pure 3,3-dimethoxy compound, the residue was chromatographed over silica and was eluted with a 9 –1 mixture of benzene and ethyl acetate. After crystallization from isopropyl ether, the product occurred in the form of colorless crystals soluble in ethanol, benzene, ether and acetone and insoluble in water. The product melted at 94°C and had a specific rotation $[\alpha]_D^{20} = 154°$ (C = 1 percent in ethanol containing 1 percent pyridine).

Analysis: $C_{23}H_{34}O_2$; molecular weight = 342.50
| | | | |
|---|---|---|---|
| Calculated: %C | 80.65 | %H | 10.00 |
| Found: | 80.4 | | 10.0 |

Step B: 7α-methyl-19-nor-$\Delta^{5(10),9(11),17(20)}$-pregnatriene-3-one 50 ml of distilled water were added to a solution of 12.76 g of the mixture of Step A in 150 ml of acetic acid and the mixture was stirred for 1 ½ hours at room temperature. The mixture was poured into an ice-water mixture which was then vacuum filtered. The precipitate was washed with water until the wash waters were neutral and then dried under reduced pressure to obtain 11.12 g of 7α-methyl-19-nor-$\Delta^{5(10),9(11),17(20)}$-pregnatriene-3-one which was used as is for the next stage. The product occurred in the form of colorless crystals melting at 80°C and soluble in alcohols and benzene and insoluble in water.

U.V. Spectrum (ethanol):
| | |
|---|---|
| Max. at 241 nm | ε = 18,950 |

Step C: 3,3-ethylenedioxy-7α-methyl-19-nor-$\Delta^{5(10),9(11),17(20)}$-pregnatriene A mixture of 11.12 g of 7α-methyl-19-nor-$\Delta^{5(10),9(11),17(20)}$-pregnatriene-3-one, 550 ml of benzene, 550 ml of methylethyldioxolane and 11 ml of ethyleneglycol was refluxed with stirring and after the addition of 334 mg of p-toluene-sulfonic acid thereto, the mixture was refluxed for 3 ¾ hours. After cooling to 20°C, 50 ml of an aqueous saturated sodium bicarbonate solution were added thereto and the mixture was stirred under a nitrogen atmosphere for 30 minutes. The aqueous phase was decanted and extracted with benzene. The organic phase was washed with water, then with an aqueous saturated sodium bicarbonate solution, dried over sodium sulfate and evaporated to dryness. The residue was crystallized from isopropyl ether to obtain 8.163 g of 3,3-ethylene-dioxy-7α-methyl-19-nor-$\Delta^{5(10),9(11),17(20)}$-pregnatriene melting at 124°C. Evaporation of the mother liquor to dryness and chromatography of the residue gave a second yield of 7 percent of the product for a total yield of 74.5 percent melting at 124°C. The pure product occurred in the form of colorless crystals melting at 124°C and had a specific rotation $[\alpha]_D^{20} = 151°$ (C = 1% in ethanol containing 1 percent of benzene). The product was soluble in ethanol, benzene and chloroform and insoluble in water.

Analysis: $C_{23}H_{32}O_2$; molecular weight = 340.49
| | | | |
|---|---|---|---|
| Calculated: %C | 81.13 | %H | 9.47 |
| Found: | 81.1 | | 9.3 |

STEP D: 3,3-ethylenedioxy-7α-methyl-19-nor-$\Delta^{5(10),9(11)}$-pregnadiene-20α-ol 16.27 g of 3,3-ethylenedioxy-7α-methyl-19-nor-$\Delta^{5(10),9(11),17(20)}$-pregnatriene were dissolved in 65 ml of tetrahydrofuran by stirring under a nitrogen atmosphere, and after cooling the solution to 0° to 5°C, 129 ml of a solution of diborane in tetrahydrofuran titrating 1.51 g of per 100 ml in boron hydride. The mixture was stirred under nitrogen for 70 minutes at 0°C after cooling to −5°C, 24 ml of water and then a solution of 24 ml of water, 24 ml of sodium hydroxide and 71 ml of ethanol were added thereto. Then, 48 ml of a 110 volumes hydrogen peroxide solution were added thereto and the mixture was stirred for 1 hour at 0°C. The mixture was poured into a water-ice mixture which was then extracted with methylene chloride. The organic phase was washed with water until the wash water was neutral, dried over sodium sulfate and then evaporated to dryness. The residue was chromatographed over silica and was eluted with a 5—5 benzene-ethyl acetate mixture. Evaporation of the eluant gave 14.967 g of 3,-3-ethylenedioxy-7α-methyl-19-nor-$\Delta^{5(10),9(11)}$-pregnadiene-20α-ol which was used as is for the next step.

I.R. Spectrum (chloroform)
Presence of ketal, of C=C and of 20α-ol
U.V. Spectrum (ethanol)
| | | | |
|---|---|---|---|
| Inflex. towards 232 nm | $E_{1cm}^{1\%}$ | = 384 | |
| Max. at 237 nm | $E_{1cm}^{1\%}$ | = 476 | |
| Max. at 243 nm | $E_{1cm}^{1\%}$ | = 519 | ε=18,600 |
| Inflex. towards 251 nm | $E_{1cm}^{1\%}$ | = 350 | |

Step E: 3,3-ethylenedioxy-7α-metyl-19-nor-$\Delta^{5(10),9(11)}$-pregnadiene-20-one A mixture of 13 g of 3,3-ethylenedioxy-7α-methyl-19-nor-$\Delta^{5(10),9(11)}$-pregnadiene-20α-ol, 113 ml of cyclohexanone and 1,930 ml of toluene was refluxed under a nitrogen atmosphere while distilling off 200 ml of solvent and then a solution of 17.4 g of aluminum isopropylate in a liter of toluene was added thereto while distilling off a liter of solvent. The mixture was cooled to room temperature and a solution of 65 g of potassium carbonate, 130 g of sodium potassium tartrate and 1,300 ml of water was added thereto with stirring under an inert atmosphere. The solvents were entrained with water and after cooling, the mixture was extracted with methylene chloride. The organic phase was washed with water, dried over sodium sulfate and evaporated to dryness under reduced pressure. The residue was chromatographed over silica and eluted with a 7–3 benzene-ethyl acetate mixture. Evaporation of the eluant gave 9.035 g of 3,3-ethylenedioxy-7α-methyl-19-nor-$\Delta^{5(10),9(11)}$-pregnadiene -20-one melting at 114°C. The product occurred as a colorless solid soluble in alcohols, benzene and acetone and insoluble in water.

I.R. Spectrum (chloroform):

Presence of non-conjugated ketone at $1,696^{cm-1}$ and of ketal.

Step F: 7α-methyl-19-nor-$\Delta^{5(10),9(11)}$-pregnadiene-3,20-dione

A solution of 9.2 g of 3,3-ethylenedioxy-7α-methyl-19-nor-$\Delta^{5(10),9(11)}$-pregnadiene-20-one in 92 ml of 75 percent acetic acid was stirred under a nitrogen atmosphere and was then heated at 55°C for 3 ½ hours. After cooling, the mixture was added to water and the mixture was neutralized with sodium bicarbonate. The mixture was extracted with ethyl acetate and the organic phase was washed with water, dried over sodium sulfate and evaporated to dryness to obtain 8.179 g of 7α-methyl-19-nor-$\Delta^{5(10),9(11)}$-pregnadiene-3,20-dione which was used as is for the next step. The product occurred as a pale yellow solid melting at 108°C and was soluble in alcohols and benzene and insoluble in water.

| U.V. Spectrum (ethanol): | | |
| --- | --- | --- |
| Inflex towards 239 nm | $E_{1cm}^{1\%}$ | = 548 |
| Max. at 242 nm | $E_{1cm}^{1\%}$ | = 561 |
| Max. at 301 nm | $E_{1cm}^{1\%}$ | = 69 |

Step G: 7α-methyl-11β-hydroperoxy-19-nor-$\Delta^{4,9}$-pregnadiene-3,20-dione

Oxygen was bubbled at room temperature through a solution of 8.16 g of 7α-methyl-19-nor-Δhu 5(10),9(11)-pregnadiene-3,20-dione in 82 ml of ethanol containing 1 percent triethylamine for 20 hours and the mixture was vacuum filtered. The precipitate was washed with iced ethanol and dried under reduced pressure to obtain 4.838 g of 7α-methyl-11β-hydroperoxy-19-nor-$\Delta^{4,9}$-pregnadiene-3,20-dione melting at 250°C. Evaporation of the mother liquors to dryness gave a second crop of 4.6 g of product for a total yield of 76 percent. The product occured as a pale yellow solid soluble in ethanol and benzene, slightly soluble in ether and insoluble in water.

I.R. Spectrum (chloroform):

Presence of non-conjugated ketone at $1,702^{cm-1}$, of conjugated ketone at $1,661^{cm-1}$, of C=C at $1,608^{cm-1}$ and of OH at $3520^{cm-1}$.

| U.V. Spectrum (ethanol): | | | |
| --- | --- | --- | --- |
| Max. at 213 nm | $E_{1cm}^{1\%}$ | = 145 | |
| Max. at 241–242 nm | $E_{1cm}^{1\%}$ | = 143 | |
| Max. at 297 nm | $E_{1cm}^{1\%}$ | = 572 | ε = 19,700 |

Step H: 7α-methyl-19-nor-$\Delta^{4,9}$-pregnadiene-11β-ol-3,20-dione 2.4 ml of trimethyl phosphite were added under an inert atmosphere to a suspension of 4.825 g of 7α-methyl-11β-hydroperoxy-19-nor-$\Delta^{4,9}$-pregnadiene-3,20-dione in 24 ml of methanol and the mixture was stirred for 40 minutes at room temperature. The ml mixture was added to a solution of 240m of water and 12ml of a 110 volumes hydrogen peroxide solution and was stirred for 15 minutes. The mixture was then extracted with methylene chloride and the organic phase was washed with water, dried over sodium sulfate and evaporated to dryness to obtain 4.53 g of 7α-methyl-19-nor-$\Delta^{4,9}$-pregnadiene-11β-ol-3,20-dione melting at 248°C. The product occurred as a colorless solid soluble in ethanol and benzene, slightly soluble in ether and insoluble in water.

I.R. Spectrum (chloroform):

Presence of non-conjugated ketone at $1,702^{cm-1}$ with a α-methyl at $1,355^{cm-1}$, of complex dienone at $1661^{cm-1}$, of C=C at 1,608 and $1,585^{cm-1}$ and of OH

| U.V. Spectrum (ethanol): | | | |
| --- | --- | --- | --- |
| Max. at 213 nm | $E_{1cm}^{1\%}$ | = 157 | |
| Max. at 237 nm | $E_{1cm}^{1\%}$ | = 149 | |
| Max. at 298–299 nm | $E_{1cm}^{1\%}$ | = 594 | ε = 19,500 |

Step I: 7α-methyl-19-nor-$\Delta^{4,9,11}$-pregnatriene-3,20-dione

A mixture of 5.16 g of 7α-methyl-19-nor-$\Delta^{4,9}$-pregnadiene-11β-ol-3,20-dione, 900 ml of methylene chloride, 22 ml of acetonitrile and 8.4 ml of perchloric acid was stirred at room temperature for 2 ½ minutes and was then poured in an aqueous sodium bicarbonate solution. The organic phase was decanted and the aqueous phase was extracted with methylene chloride. The organic phase was washed with water, dried over sodium sulfate and evaporated to dryness under reduced pressure to obtain 3.494 g of 7α-methyl-19-nor-$\Delta^{4,9,11}$-pregnatriene-3,20-dione melting at 133°C and having a specific rotation $[\alpha]_D^{20} = +17.5°$ ( c = 0.5 percent in ethanol). The product occurred as pale yellow crystals soluble in alcohols and benzene and insoluble in water.

| Analysis: $C_{21}H_{26}O_2$; molecular weight = 310.42 | | |
| --- | --- | --- |
| | %C | %H |
| Calculated: | 81.24 | 8.44 |
| Found: | 81.3 | 8.4 |

PHARMACOLOGICAL DATA

A. Antigonadotrophic Activity

The antigonadotrophic activity of 7α-methyl-19-nor-$\Delta^{4,9,11}$-pregnatriene-3,20-dione was determined on puberic rats weighing about 200 g by subcutaneous administration in a volume of 0.2 ml in solution in sesame oil containing 5 percent benzyl alcohol. There were 12 treatments over 14 days at a daily dose of 2 mg per animal. On the 15th day, the animals were killed by carotidienne bleeding and the seminal vesiculs prostate, testicules and surrenals were recovered and weighed. The results are reported in Table I.

TABLE I

|  | Daily Doses | Testicules in mg | Seminals Vesiculs in mg | Prostate in mg | Surrenals in mg |
|---|---|---|---|---|---|
| Controls | 0 | 2 900 | 761.6 | 462.6 | 42.6 |
| Product | 200γ | 2 600 | 591.1 (−22%) | 363.9 (−21%) | 36.7 |
|  | 1 mg | 2 700 | 397.9 (−48%) | 240.3 (−48%) | 39.0 |

The results of Table I show that the product has antigonadotrophic activity with a clear anti LH predominance and does not provoke surrenalien aplasia.

B. Exogenic Antiandrogenic Activity

This activity was determined with testosterone propionate on castrated male rats by the Lerner method described by Dorfman in Methods in Hormone Research, II, p. 320. The 4-week old male rats were castrated and the treatment was started the next day and lasted for 7 days. On the 8th day, the animals were killed and the prostate, seminal vesiculs and levator ani were recovered. The two products were used as solutions in sesame oil containing 5 percent benzyl alcohol and were separately administered subcutaneously. The test product was administered at a dose of 1 mg and testosterone propionate was administered at a dose of 50γ. A control group received only the solvent, a second group received 50γ of testosterone propionate subcutaneously, a third group received subcutaneously 50γ, 200γ or 1 mg of 7α-methyl-19-nor-Δ$^{4,9,11}$-pregnatriene-3,20-dione and the fourth group received subcutaneously 50γ of testosterone propionate and 50γ, 200γ or 1 mg of the said test product. The results are reported in Table II.

TABLE II

| Group | Daily Doses | Fresh Levator ani in mg | Seminals Vesiculs in mg | Prostate in mg |
|---|---|---|---|---|
| Controls | 0 | 37.1 | 16.9 | 19.2 |
| Testosterone Propionate | 50γ | 48.7 | 122.5 | 156.6 |
| Test Product | 50γ | 31.7 | 12.5 | 19.3 |
| Test Product + Testosterone Propionate | 50γ + 50γ | 84.2 49.3 (−21%) | 118.7 (−26%) |  |
| Test Product | 200γ | 42.3 | 7.9 | 15.5 |
| Test Product + Testosterone Propionate | 200γ + 50γ | 64.2 | 82.2 (−23%) | 105.2 (−33%) |
| Controls | 0 | 39.1 | 16.5 | 17.0 |
| Testosterone Propionate | 50γ | 40.3 | 101.9 | 119.5 |
| Test Product | 1 mg | 37.2 | 30.2 | 44.9 |
| Test Product + Testosterone Propionate | 1 mg + 50γ | 38.4 | 51.1 (−49%) | 60.9 (−40%) |

The results of Table II show that the said product of the invention has an important exogenic antiandrogenic activity at a dose of 50γ against testosterone propionate.

C. Antiestrogenic Activity

The antiestrogenic activity of 7α-methyl-19-nor-Δ$^{4,9,11}$-pregnatriene-3,20-dione was determined on impuberic mice by a technique inspired by Rubin [Endo., Vol. 49 (1951), p. 429] and the related test of Dorfman et al. [Methods in Hormone Research, Vol. II (1962), p. 118]. The estrogen used was estradiol and mice aged 19 to 21 days received a daily subcutaneous injection for 3 days of estradiol alone, the test product alone or estradiol and the test product. In the last case, the two steroids were injected at different parts. The mice were killed on the 4 th day and the uterus was removed and weighed. Estradiol was administered in a sesame oil solution containing 5 percent of benzyl alcohol at a total dose of 0.27γ with each injection having a volume of 0.1 ml per mouse. The test product was administered in the same solution at a total does of 10, 30 or 90γ with each injection having a volume of 0.1 ml per mouse. The results are reported in Table III.

TABLE III

| Group | Doses in γ | Average weight of uterus in mg |
|---|---|---|
| Controls | 0 | 16.6 |
| Estradiol | 0.27 | 60.2 |
| Test Product | 10 | 14.1 |
| Test Product + Estradiol | 10 + 0.27 | 57.0 |
| Test Product | 30 | 13.5 |
| Test Product + Estradiol | 30 + 0.27 | 51.4 |
| Test Product | 90 | 16.5 |
| Test Product + Estradiol | 90 + 0.27 | 43.0 (−28%) |

Table III shows that the test compound has a clear antiestrogenic activity against 0.27γ of estradiol at a dose of 90γ.

D. Progestomimetic Activity

The progestomimetic activity was determined by the Clauberg test on immature rabbits previously sensitized by subcutaneous administration of a daily dose of 10γ of estradiol benzoate over 5 days. The animals were then treated for 5 days with subcutaneous administration of 50 or 200γ of 7α-methyl-19-nor-Δ$^{4,9,11}$-pregnatriene-3,20-dione in solution in olive oil containing 5 percent benzyl alcohol. The animals were killed on the 6th day and the uterus was cut and examined for proliferation of endometric lace characteristic of progestomimetic acitivity in MacPhail units. The results are reported in Table IV.

TABLE IV

| Product | Daily Dose | MacPhil Units |
|---|---|---|
| 7α-methyl-19-nor-Δ$^{4,9,11}$-pregnatriene-3,20-dione | 50γ | 0.5 |
|  | 200γ | 3.5 |

The results of Table IV show that the said product has an important progestomimetic activity at a daily dose of 200γ.

Various modifications of the products and methods of the invention may be made without departing from the spirit or scope thereof and it is to be understood that the invention is to be limited only as defined in the appended cliams.

We claim:

1. A 7α-methyl-13β-alkyl-18,19-dinor-Δ$^{4,9,11}$-pregnatriene-3,20-dione of the formula

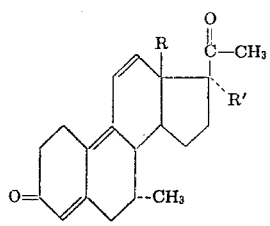

wherein R is alkyl of one to three carbon atoms and R' is selected from the group consisting of hydrogen, alkyl of one to three carbon atoms and OR'' wherein R'' is selected from the group consisting of hydrogen and acyl of an organic carboxylic acid of one to 18 carbon atoms.

2. A compound of claim 1 which is 7α-methyl-19-nor-$\Delta^{4,9,11}$-pregnatriene-3,20-dione.

3. A process for the preparation of a compound of claim 1 comprising subjecting a ketal of the formula

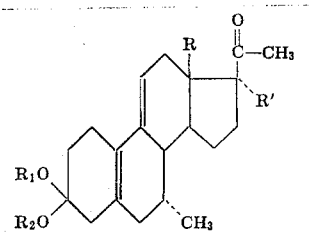

wherein R and R' have the above definition and $R_1$ and $R_2$ are alkyl of one to five carbon atoms or together form an alkylene of two to four carbon atoms to acid hydrolysis to form a compound of the formula

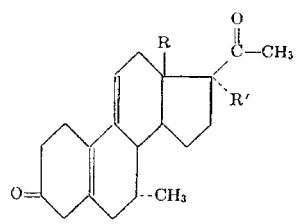

reacting the latter with a hydroperoxidation agent to form a compound of the formula

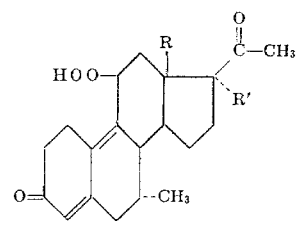

reducing the latter with a reducing agent to form a compound of the formula

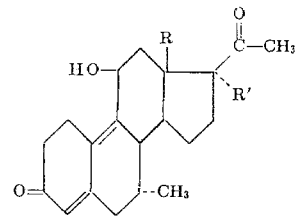

and dehydrating the latter with a mineral acid to form the corresponding compound of claim 1.

* * * * *